United States Patent
Zhou et al.

(10) Patent No.: US 8,834,006 B2
(45) Date of Patent: Sep. 16, 2014

(54) BACKLIGHT MODULE AND LIQUID CRYSTAL DISPLAY DEVICE

(75) Inventors: Gege Zhou, Shenzhen (CN); Dehua Li, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 158 days.

(21) Appl. No.: 13/580,136

(22) PCT Filed: Jul. 27, 2012

(86) PCT No.: PCT/CN2012/079230
§ 371 (c)(1),
(2), (4) Date: Aug. 20, 2012

(87) PCT Pub. No.: WO2014/015506
PCT Pub. Date: Jan. 30, 2014

(65) Prior Publication Data
US 2014/0029301 A1    Jan. 30, 2014

(51) Int. Cl.
*F21V 8/00* (2006.01)
*F21V 29/00* (2006.01)
*G02F 1/1335* (2006.01)
*G02F 1/1333* (2006.01)

(52) U.S. Cl.
CPC .......... *G02F 1/133615* (2013.01); *F21V 29/20* (2013.01); *G02B 6/0023* (2013.01); *G02B 6/0085* (2013.01); *G02B 6/0086* (2013.01); *G02F 2001/133314* (2013.01)
USPC ........... 362/633; 362/294; 362/373; 362/580; 362/613; 362/624

(58) Field of Classification Search
CPC .................. G02F 1/133608; G02F 1/133615; G02F 1/133308; G02F 2001/133314; G02F 2001/133322; G02F 1/133603; G02F 2201/46; G02F 2001/133628; G02B 6/0073; G02B 6/0085; G02B 6/0011; G02B 6/0023; G02B 6/0086; F21V 29/002; F21V 29/004; F21V 29/20
USPC ......... 362/294, 373, 580, 612, 613, 632, 633, 362/634, 615, 624
See application file for complete search history.

(56) References Cited

U.S. PATENT DOCUMENTS

| | | | |
|---|---|---|---|
| 7,771,108 B2* | 8/2010 | Iwasaki | 362/634 |
| 8,426,877 B2* | 4/2013 | Zhang et al. | 257/88 |
| 8,608,346 B2* | 12/2013 | Wang et al. | 362/294 |
| 2011/0025942 A1* | 2/2011 | Lee | 349/58 |
| 2011/0286235 A1* | 11/2011 | Tsai et al. | 362/606 |

(Continued)

*Primary Examiner* — Alan Cariaso
(74) *Attorney, Agent, or Firm* — Andrew C. Cheng

(57) ABSTRACT

The present invention discloses a backlight module which can be incorporated within the liquid crystal display device, and which includes a waveguide, a heat dissipating frame, a light source and a backframe. The heat dissipating frame includes a carrying portion and a sidewalk. The carrying portion abuts against a bottom surface of the waveguide. The carrying portion is defined with openings in an area adjacent to the sidewalk. The light source is mounted onto the sidewall and offset to the opening. The backframe includes a bottom board and erections which extend and pass through the opening. The bottom board abuts the carrying portion. The thickness of the erection is larger than the thickness of the light source such that expansion of the waveguide exposed under heat will not in contacting with the light source. Accordingly, the light source will not be damaged by the expansion of the waveguide, and therefore prolong the service of the light source.

20 Claims, 3 Drawing Sheets

(56) References Cited

U.S. PATENT DOCUMENTS

2011/0286241 A1* 11/2011 Pan et al. .................. 362/607
2011/0292317 A1* 12/2011 Kim et al. .................. 349/61
2013/0044279 A1* 2/2013 Kuo et al. .................. 349/65
2013/0265526 A1* 10/2013 PARK et al. ................ 349/65

* cited by examiner

BACKLIGHT MODULE AND LIQUID CRYSTAL DISPLAY DEVICE

FIELD OF THE INVENTION

The present invention relates to a technology of liquid crystal display, and more particularly to a backlight module and a liquid crystal display device incorporated with such a backlight module.

DESCRIPTION OF PRIOR ART

For a liquid crystal display device, since the liquid crystal display panel itself does not emit light, a backlight module has to be incorporated so as to display the patterns and figures shown in the panel. The quality of the backlight module will directly affect the image quality of the liquid crystal display device. Accordingly, the backlight module has come a vital part of the liquid crystal display device.

Currently, the light source incorporated within the backlight module is arranged in a so-called side-emitting, i.e. an LED light strip is arranged on a side of a waveguide, and the light beam emitted from the LED light strip will enter the waveguide from the side. Then, the light beam is evenly distributed across the waveguide so as to transform into a surface light. Referring to FIG. 1, which is a cross sectional and illustrational view of a convention backlight module. The backlight module generally includes a backframe 110, a heat dissipating frame 120, a waveguide 130, and an LED light strip 140. The heat dissipating frame and the backframe 110 are stacked together, and the LED light strip 140 is arranged on the heat dissipating frame 120 facing the waveguide 130. The light source arranged in this backlight module is the type of side-emitting and there has to be a gap between the LED light strip 140 and the waveguide 130 so as to ensure a proper coupling as well as prevent the so-called mura effect, i.e. non-uniform of color.

However, the waveguide 130 swells or expands when it is exposed heat generated within the backlight module. In addition, there is a narrow gap between the LED light, strip 140 and the waveguide 130, as a result, the expansion of the waveguide 130 will eventually abut against a surface of the LED light strip 140, and risking the service life of the backlight module.

SUMMARY OF THE INVENTION

It is the purpose of the present invention to provide a technical solution to the prior art by introducing a backlight module and a liquid crystal display device incorporated with such a backlight module. The backlight module is provided with an arrangement effectively prevent the expansion of the waveguide from in contacting with the light source. As a result, the light source will not be damaged by the expansion of the waveguide.

In order to resolve the technical issue encountered by the prior art, the present invention introduce a technical solution by providing a backlight module which comprises a waveguide having a light emitting surface, and an incident surface adjacent to the emitting surface, and a bottom surface opposite to the light emitting surface. A reflective film is arranged closely to the bottom surface of the waveguide. A heat dissipating frame includes a carrying portion, and sidewall extending toward a light emitting direction from edges of the carrying portion, the carrying portion abutting toward the reflective film, and the carrying portion further defining a plurality of openings located at an area adjacent to the sidewall, the sidewall being arranged adjacent to the incident surface of the waveguide. A power supply printed circuit board is disposed on the sidewall facing the incident surface of the waveguide. A plurality of light sources is alternatively arranged onto the power supply printed circuit board and facing toward the incident surface of the waveguide, a space between two adjacent light sources being aligning to the opening of the carrying portion such that each of the light sources is offset with respect to the opening. A backframe includes a bottom board abutting against the carrying portion, and a plurality of erections alternately arranged and extending from edges of the bottom board, each of the erections extending through the openings of the carrying portion, and the bottom board abutting the carrying portion. And wherein the overall thickness of the erections is larger than the thickness of the light sources such that when the expansion of the waveguide when exposed to heat, the erections can prevent the waveguide from in contact with the light sources.

Wherein the heat dissipating frame is made from aluminum extrusion.

Wherein a surface of the carrying portion of the heat dissipating frame is provided with an embossment toward the waveguide, wherein the embossments abut against the reflective film so as to increase the surface area of the reflective film in contacting with air.

Wherein the light source is an LED light.

In order to resolve the technical issue encountered by the prior art, the present invention introduce a technical solution by providing a backlight module which comprises a waveguide having a light emitting surface, and an incident surface adjacent to the emitting surface, and a bottom surface opposite to the light emitting surface. A heat dissipating frame includes a carrying portion, and sidewall extending toward a light emitting direction from edges of the carrying portion, the carrying portion abutting the bottom surface of the waveguide, and the carrying portion further defining a plurality of openings located at an area adjacent to the sidewall, the sidewall being arranged adjacent to the incident surface of the waveguide. A light source is arranged facing to the incident surface of the waveguide and disposed on the sidewall, the light source being arranged offset with respect to the openings defined in the carrying portion. A backframe includes a bottom board abutting against the carrying portion, and an erection extending from edge of the bottom board, the erection extending through the openings of the carrying portion, and the bottom board abutting the carrying portion. And wherein the overall thickness of the erections is larger than the thickness of the light sources such that when the expansion of the waveguide when exposed to heat, the erections can prevent the waveguide from in contact with the light source.

Wherein the carrying portion is defined with a plurality of openings located in an area adjacent to the sidewalk wherein the bottom board is provided with a plurality of erections alternatively arranged and pointing toward the light emitting direction, wherein each of the erections passes through the corresponding opening.

Wherein there is a plurality of the light sources, and the light sources are alternatively arranged on the sidewall, a space between two adjacent light sources being aligning to the opening of the carrying portion such that each of the light sources is offset with respect to the opening.

Wherein the backlight module includes a power supply printed circuit board which is arranged facing the incident surface of the waveguide and is arranged on the sidewalk a plurality of light sources is arranged on the power supply printed circuit board.

Wherein the heat dissipating frame is made from aluminum extrusion.

Wherein the backlight module further includes a reflective film abutting against the bottom surface of the waveguide, the carrying portion of the heat dissipating frame abutting against the reflective film.

Wherein a surface of the earning portion of the heat dissipating frame is provided with an embossment toward the waveguide, wherein the embossments abut against the reflective film so as to increase the surface area of the reflective film in contacting with air.

Wherein the light source is an LED light.

In order to resolve the technical issue encountered by the prior art, the present invention introduce a technical solution by providing a liquid crystal display device, including a liquid crystal display panel, and further including a backlight module which comprises a waveguide having a light emitting surface, and an incident surface adjacent to the emitting surface, and a bottom surface opposite to the light emitting surface. A heat dissipating frame includes a carrying portion, and sidewall extending toward a light emitting direction from edges of the carrying portion, the carrying portion abutting the bottom surface of the waveguide, and the carrying portion further defining a plurality of openings located at an area adjacent to the sidewall, the sidewall being arranged adjacent to the incident surface of the waveguide. A light source is arranged facing to the incident surface of the waveguide and disposed on the sidewall, the light source being arranged offset with respect to the openings defined in the carrying portion. A backframe includes a bottom board abutting against the carrying portion, and an erection extending from edge of the bottom board, the erection extending through the openings of the carrying portion, and the bottom board abutting the carrying portion. And wherein the liquid crystal display panel is arranged closely adjacent the light emitting surface of the waveguide, wherein the overall thickness of the erections is larger than the thickness of the light sources such that when the expansion of the waveguide when exposed to heat, the erections can prevent the waveguide from in contact with the light source.

Wherein when the backlight module is assembled into the liquid crystal display device, a sidewall which is distant to the light source is exposed to atmosphere.

Wherein the carrying portion is defined with a plurality of openings located in an area adjacent to the sidewall, wherein the bottom board is provided with a plurality of erections alternatively arranged and pointing toward the Sight emitting direction, wherein each, of the erections passes through the corresponding opening.

Wherein there is a plurality of the light sources, and the light sources are alternatively arranged on the sidewalk a space between two adjacent light sources being aligning to the opening of the carrying portion such that each of the light sources is offset with respect to the opening.

Wherein the backlight module includes a power supply printed circuit board which is arranged facing the incident surface of the waveguide and is arranged on the sidewalk a plurality of light sources is arranged on the power supply printed circuit board.

Wherein, the backlight module further includes a reflective film abutting against the bottom surface of the waveguide, the carrying portion of the heat dissipating frame abutting against the reflective film.

Wherein a surface of the carrying portion of the heat dissipating frame is provided with an embossment toward the waveguide, wherein the embossments abut against the reflective film so as to increase the surface area of the reflective film in contacting with air.

Wherein, the heat dissipating frame is made from aluminum extrusion, and the light source is an LED light.

In conclusion, the present invention provides a backlight module and a liquid crystal display device with a plurality of openings defined in an area in a carrying portion adjacent to a sidewall thereof. In addition, the sidewall of the carrying portion is mounted with a light source which is offset from the opening. An erection of the backframe can pass through the opening. Wherein the thickness of the erection is larger than the thickness of the light source such that expansion of the waveguide exposed under heat will not in contact with the light source. Accordingly, the light source will not be damaged by the expansion of the waveguide, and therefore prolong the service of the light source.

The above described is merely a summary of the present invention. In order to give a better and thorough understanding to the whole and other intended purposes, features and advantages of the technical solution of the present invention, detailed description will be given with respect to preferred embodiments provided and illustrated herebelow in accompanied drawings.

DETAILED DESCRIPTION OF PREFERRED EMBODIMENT

Figure 1:
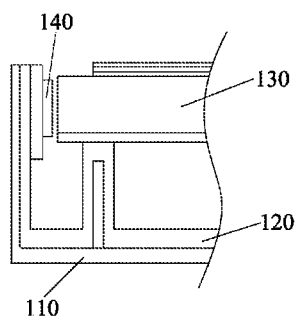
FIG. 1 is a cross sectional and illustration view of a backlight module.

In order clearly explain the technology of the embodiment illustrated in the present invention, a brief and concise description will be given along with the accompanied drawings. Apparently, the embodiments illustrated in the drawings are merely some typical embodiments and which can be readily modified by the skilled in the art without any additional laborious efforts so as to transform them into other drawings, and they should all be covered by the appended claims.

Figure 2:
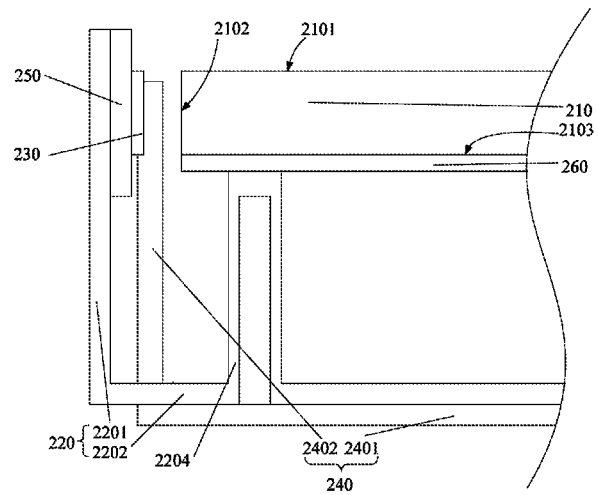
FIG. 2 is a cross sectional and illustration view of a backlight module made in accordance with the present invention.

Referring to FIG. 2, which is a cross sectional and illustration view of a backlight module made in accordance with the present invention. The backlight module includes a waveguide 210, a heat dissipating frame 220, a light source 230, and a backframe 240. The waveguide 210 includes a light emitting surface 2101, an incident surface 2102 adjacent to the light emitting surface 2101, and a bottom surface 2103 opposite to the light emitting surface 2101. The heat dissipating frame 220 includes a carrying portion 2202, and a sidewall wall 2201 extending from a light emitting direction from edge of the carrying portion 2202. The carrying portion 2202 abuts against the bottom surface 2013 of the waveguide 210. The sidewall 2201 is arranged adjacent to the incident surface 2102 of the waveguide 210.

Figure 3:
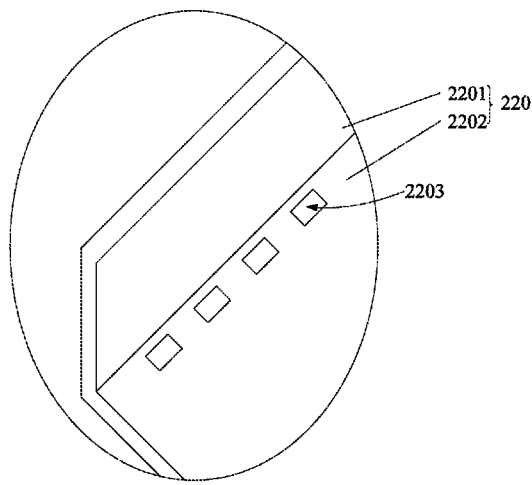
FIG. 3 is a partial perspective view of the backlight module shown in FIG. 2.

Now referring to FIG. 3, which is a partial perspective view of the backlight module shown in FIG. 2. In the current embodiment, the heat dissipating frame 220 is made from aluminum extrusion. The aluminum extrusion is made through molten aluminum alloy and then extruded with proper mold. The heat dissipating frame 220 is defined with openings 2203. Substantially, the carrying portion 2202 is provided with the openings 2203 in an area adjacent to the sidewall 2201. In the current embodiment, the openings 2203 arranged adjacent to the sidewall 2201 is alternatively and distant from each other.

Referring now back to FIG. 2, the light source 230 is mounted onto the sidewall 2201 and is facing toward the incident surface 2102 of the waveguide 210. The light source 230 is offset from the opening 2203. The backframe 240 includes a bottom board 2401, and an erection 2402 arranged on edge of the bottom board 2401 pointing toward the light emitting direction. The erection 2402 extends and passes through the opening 2203, and the bottom board 2401 abuts against the carrying portion 2202.

Figure 4:
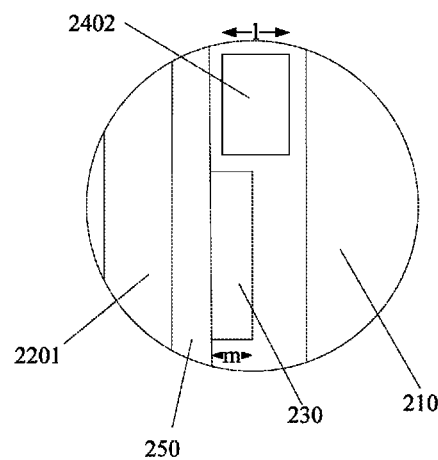
FIG. 4 is a top view of the backlight module shown in FIG. 2.

Referring to FIG. 4 which is a top view of the backlight module shown in FIG. 2. As shown in FIG. 4, the thickness "l" of the erection 2402 is larger the thickness "m" of the light source 230. Accordingly, when the waveguide 210 expands as exposed to heat, the erection 2402 can effectively prevent the waveguide 210 from in contacting with the light source 230. Accordingly, the light source 230 will not be damaged by the expansion of the waveguide 210. In light of this, the light source 230 is properly protected, and the service life of the backlight module is prolonged.

Figure 5:
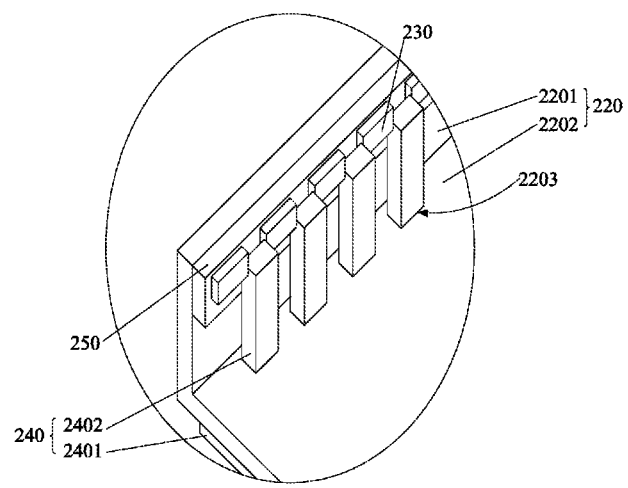
FIG. 5 is a partial perspective view of the backlight module shown in FIG. 2.

Referring now to FIG. 5, which is a partial perspective view of the backlight module shown in FIG. 2. As shown, there is a plurality of erections 2402 arranged on the bottom board 2401, and each of the erections 2402 extends and passes through the opening 2203. In addition, there is a plurality of light sources 230, and which are alternatively arranged. In the current embodiment, a space between every two adjacent light sources 230 is aligned with the opening 2203 such that the light source 230 is properly offset from the opening 2203.

Referring to FIG. 2, the backlight module further includes a power supply printed circuit board 250 for light source, and a reflective film 260. The power supply printed circuit board 250 is mounted onto the sidewall 2201 facing to the incident surface of the waveguide, and is located between the light source 230 and the sidewall 2201. The plurality of light sources 230 are mounted onto the printed circuit board 250. In the current embodiment, the light source is an LED light. The reflective film 260 abuts against the bottom surface 2103 of the waveguide 210. The carrying portion 2202 abuts against the reflective film 260. Furthermore, a surface of the carrying portion 2202 is provided with an embossment 2204 pointing toward the light emitting direction of the waveguide 210. The embossment 2204 abuts against the reflective film 260 so as to support the reflective film 260 and the waveguide 210. By this arrangement, the surface area of the reflective film 260 in contacting with the air is increased. The waveguide 210 is supported by only one embossment 2204, and this arrangement largely increases the surface area of both the reflective film 260 and the heat dissipating frame 220 in contacting with the air. In turn, the heat dissipating area of both the waveguide 210 and the heat dissipating frame 220 is increased. The embossment 2204 can be made with a hollowed configuration so as to save the material cost and reduce the weight. It should be noted that the number of the embossment 2204 can be readily increased according to the field requirements.

In addition, the present invention further provides a liquid crystal display device which includes a liquid crystal display panel and a backlight module implemented and described from the above described embodiments. The liquid crystal display panel is arranged to the light emitting surface 2101 of the waveguide 210. When the backlight module is assembled into the liquid crystal display device, the sidewall 2201 which is distant to the light source 230 is exposed within the air so as to increase the heat dissipating surface of the backlight module.

By way of forgoing, the present invention provides a backlight module and a liquid crystal display device with a plurality of openings defined in an area in a carrying portion adjacent to a sidewall thereof. In addition, the sidewall of the carrying portion is mounted with a light source which is offset from the opening. An erection of the backframe can pass through the opening. Wherein the thickness of the erection is larger than the thickness of the light source such that expansion of the waveguide exposed under heat will not in contact with the light source. Accordingly, the light source will not be damaged by the expansion of the waveguide, and therefore prolong the service of the light source.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A backlight module, comprising:
   a waveguide having a light emitting surface, and an incident surface adjacent to the emitting surface, and a bottom surface opposite to the light emitting surface;
   a reflective film arranged closely to the bottom surface of the waveguide;
   a heat dissipating frame including a carrying portion, and sidewall extending toward a light emitting direction from edges of the carrying portion, the carrying portion abutting toward the reflective film, and the carrying portion further defining a plurality of openings located at an area adjacent to the sidewall, the sidewall being arranged adjacent to the incident surface of the waveguide;
   a power supply printed circuit board disposed on the sidewall facing the incident surface of the waveguide;
   a plurality of light sources alternatively arranged onto the power supply printed circuit board and facing toward the incident surface of the waveguide, a space between two adjacent light sources being aligning to the opening of the carrying portion such that each of the light sources is offset with respect to the opening;
   a backframe including a bottom board abutting against the carrying portion, and a plurality of erections alternately arranged and extending from edges of the bottom board, each of the erections extending through the openings of the carrying portion, and the bottom board abutting the carrying portion; and
   wherein the overall thickness of the erections is larger than the thickness of the light sources such that when the expansion of the waveguide when exposed to heat, the erections can prevent the waveguide from in contact with the light sources.

2. The backlight module as recited in claim 1, wherein the heat dissipating frame is made from aluminum extrusion.

3. The backlight module as recited in claim 1, wherein a surface of the carrying portion of the heat dissipating frame is provided with an embossment toward the waveguide, wherein the embossments abut against the reflective film so as to increase the surface area of the reflective film in contact with air.

4. The backlight module as recited in claim 1, wherein the light source is an LED light.

5. A backlight module, comprising:
a waveguide having a light emitting surface, and an incident surface adjacent to the emitting surface, and a bottom surface opposite to the light emitting surface;
a heat dissipating frame including a carrying portion, and sidewall extending toward a light emitting direction from edges of the carrying portion, the carrying portion abutting the bottom surface of the waveguide, and the carrying portion further defining a plurality of openings located at an area adjacent to the sidewall, the sidewall being arranged adjacent to the incident surface of the waveguide;
a light source arranged facing to the incident surface of the waveguide and disposed on the sidewall, the light source being arranged offset with respect to the openings defined in the carrying portion;
a backframe including a bottom board abutting against the carrying portion, and an erection extending from edge of the bottom board, the erection extending through the openings of the carrying portion, and the bottom board abutting the carrying portion; and
wherein the overall thickness of the erections is larger than the thickness of the light sources such that when the expansion of the waveguide when exposed to heat, the erections can prevent the waveguide from in contact with the light source.

6. The backframe as recited in claim 5, wherein the carrying portion is defined with a plurality of openings located in an area adjacent to the sidewall, wherein the bottom board is provided with a plurality of erections alternatively arranged and pointing toward the light emitting direction, wherein each of the erections passes through the corresponding opening.

7. The backlight module as recited in claim 6, wherein there is a plurality of the light sources, and the light sources are alternatively arranged on the sidewall, a space between two adjacent light sources being aligning to the opening of the carrying portion such that each of the light sources is offset with respect to the opening.

8. The backlight module as recited in claim 7, wherein the backlight module includes a power supply printed circuit board which is arranged facing the incident surface of the waveguide and is arranged on the sidewall, a plurality of light sources is arranged on the power supply printed circuit board.

9. The backlight module as recited in claim 5, wherein the heat dissipating frame is made from aluminum extrusion.

10. The backlight module as recited in claim 5, wherein the backlight module further includes a reflective film abutting against the bottom surface of the waveguide, the carrying portion of the heat dissipating frame abutting against the reflective film.

11. The backlight module as recited in claim 10, wherein a surface of the carrying portion of the heat dissipating frame is provided with an embossment toward the waveguide, wherein the embossments abut against the reflective film so as to increase the surface area of the reflective film in contact with air.

12. The backlight module as recited in claim 5, wherein the light source is an LED light.

13. A liquid crystal display device, including a liquid crystal display panel, and further including a backlight module comprising:
a waveguide having a light emitting surface, and an incident surface adjacent to the emitting surface, and a bottom surface opposite to the light emitting surface;
a heat dissipating frame including a carrying portion, and sidewall extending toward a light emitting direction from edges of the carrying portion, the carrying portion abutting the bottom surface of the waveguide, and the carrying portion further defining a plurality of openings located at an area adjacent to the sidewall, the sidewall being arranged adjacent to the incident surface of the waveguide;
a light source arranged facing to the incident surface of the waveguide and disposed on the sidewall, the light source being arranged offset with respect to the openings defined in the carrying portion;
a backframe including a bottom board abutting against the carrying portion, and an erection extending from edge of the bottom board, the erection extending through the openings of the carrying portion, and the bottom board abutting the carrying portion; and
wherein the liquid crystal display panel is arranged closely adjacent the light emitting surface of the waveguide, wherein the overall thickness of the erections is larger than the thickness of the light sources such that when the expansion of the waveguide when exposed to heat, the erections can prevent the waveguide from in contact with the light source.

14. The liquid crystal display device as recited in claim 13, wherein when the backlight module is assembled into the liquid crystal display device, a sidewall which is distant to the light source is exposed to atmosphere.

15. The liquid crystal display device in claim 13, wherein the carrying portion is defined with a plurality of openings located in an area adjacent to the sidewall, wherein the bottom board is provided with a plurality of erections alternatively arranged and pointing toward the light emitting direction, wherein each of the erections passes through the corresponding opening.

16. The liquid crystal display device as recited in claim 15, wherein there is a plurality of the light sources, and the light sources are alternatively arranged on the sidewall, a space between two adjacent light sources being aligning to the opening of the carrying portion such that each of the light sources is offset with respect to the opening.

17. The liquid crystal display device as recited in claim 16, wherein the backlight module includes a power supply printed circuit board which is arranged facing the incident surface of the waveguide and is arranged on the sidewall, a plurality of light sources is arranged on the power supply printed circuit board.

18. The liquid crystal display device as recited in claim 13, wherein the backlight module further includes a reflective film abutting against the bottom surface of the waveguide, the carrying portion of the heat dissipating frame abutting against the reflective film.

19. The liquid crystal display device as recited in claim 18, wherein a surface of the carrying portion of the heat dissipating frame is provided with an embossment toward the waveguide, wherein the embossments abut against the reflective film so as to increase the surface area of the reflective film in contact with air.

20. The liquid crystal display device as recited in claim 13, wherein the light source is an LED light.

* * * * *